US011566193B2

(12) United States Patent
Sandberg et al.

(10) Patent No.: US 11,566,193 B2
(45) Date of Patent: Jan. 31, 2023

(54) AVIATION FUEL COMPOSITION

(71) Applicant: Neste Corporation, Espoo (FI)

(72) Inventors: Kati Sandberg, Järvenpää (FI); Ulla Kiiski, Porvoo (FI)

(73) Assignee: NESTE CORPORATION, Espoo (FI)

(*) Notice: Subject to any disclaimer, the term of this patent is extended or adjusted under 35 U.S.C. 154(b) by 193 days.

(21) Appl. No.: 16/064,737

(22) PCT Filed: Dec. 14, 2016

(86) PCT No.: PCT/EP2016/080976
§ 371 (c)(1),
(2) Date: Jun. 21, 2018

(87) PCT Pub. No.: WO2017/108529
PCT Pub. Date: Jun. 29, 2017

(65) Prior Publication Data
US 2019/0002778 A1 Jan. 3, 2019

(30) Foreign Application Priority Data
Dec. 21, 2015 (EP) ..................................... 15201562

(51) Int. Cl.
C10L 1/04 (2006.01)
C10L 1/08 (2006.01)

(52) U.S. Cl.
CPC .................. C10L 1/04 (2013.01); C10L 1/08 (2013.01); C10G 2300/1011 (2013.01); C10G 2400/04 (2013.01); C10G 2400/08 (2013.01); C10L 2200/043 (2013.01); C10L 2200/0476 (2013.01); C10L 2200/0492 (2013.01); C10L 2270/04 (2013.01); Y02E 50/10 (2013.01); Y02P 30/20 (2015.11); Y02T 50/678 (2013.01)

(58) Field of Classification Search
CPC ....... C10L 2200/043; C10L 2200/0469; C10L 2270/04
See application file for complete search history.

(56) References Cited

U.S. PATENT DOCUMENTS

| 8,278,492 | B2 | 10/2012 | Myllyoja et al. | |
|---|---|---|---|---|
| 8,641,788 | B2* | 2/2014 | Lamoureaux | C10L 1/02 44/452 |
| 2007/0187292 | A1* | 8/2007 | Miller | C10L 1/04 208/15 |
| 2009/0229172 | A1* | 9/2009 | Brady | C10L 1/026 44/307 |
| 2009/0255172 | A1* | 10/2009 | Choo | C10L 1/02 44/388 |
| 2009/0287029 | A1 | 11/2009 | Anumakonda et al. | |
| 2009/0299109 | A1 | 12/2009 | Gruber et al. | |
| 2011/0105812 | A1 | 5/2011 | Marker et al. | |
| 2012/0209038 | A1 | 8/2012 | Iguchi et al. | |
| 2012/0238787 | A1* | 9/2012 | Gruber | C07C 1/24 585/14 |
| 2014/0007498 | A1 | 1/2014 | Wells et al. | |
| 2014/0323777 | A1* | 10/2014 | Iguchi | C10G 45/58 585/240 |
| 2015/0011784 | A1 | 1/2015 | Aoki et al. | |
| 2015/0112106 | A1* | 4/2015 | Rockwell | C10L 10/02 585/14 |
| 2015/0266589 | A1* | 9/2015 | Blumer | B64D 37/30 244/135 R |

FOREIGN PATENT DOCUMENTS

| WO | 2005026297 A1 | 3/2005 | |
|---|---|---|---|
| WO | 2008124607 A1 | 10/2008 | |
| WO | WO 2013/012983 A1 | 1/2013 | |
| WO | WO-2013012983 A1 * | 1/2013 | ............... C10L 1/02 |

OTHER PUBLICATIONS

Tim Edwards, "Kerosene" fuels for Aerospace Propulsion—Composition and Properties, 2002, Airforce Research Laboratory, pp. 7 (Year: 2002).*
Heather D. Willauer, Dennis R. Hardy, Robert E. Morris, Frederick W. Williams, Potential for Peroxide and Gum Formation in Ultra-Low-Sulfur Diesel Fuels, 2014, Naval Research Laboratory, pp. 1 and 15 (Year: 2014).*
JoséAntonio Soriano, Reyes Garcia-Contreras, David Leiva-Candia, and Felipe Soto, Influence on Performance and Emissions of an Automotive Diesel Engine Fueled with Biodiesel and Paraffinic Fuels: GTL and Biojet Fuel Farnesane, Energy & Fuels 2018 32 (4), 5125-5133 (Year: 2018).*
Ken-ichi Maruya *, Kazumi Ito, Kazuhito Kushihashi, Yoshiho Kishida, Kazunari Domen and Takaharu Onishi, Isoprene formation from CO and H2 over Ce02 catalysts, Catalysis Letters 14, 1992, 123-126 (Year: 1992).*
Jose Antonio Soriano, Reyes Garcia-Contreras, David Leiva-Candia, and Felipe Soto, Influence on Performance and Emissions of an Automotive Diesel Engine Fueled with Biodiesel and Paraffinic Fuels: GTL and Biojet Fuel Farnesane, Energy & Fuels 201832 (4), 5125-5133 (Year: 1992).*
Ken-ichi Maruya*, Kazumilto, Kazuhito Kushihashi, Yoshino Kishida, Kazunari Domen and Takaharu Onishi, llsoprene formation from CO and H2 over Ce02 catalysts, Catalysis Letters 14,1992, 123-126 (Year: 1992).*
Alexander Zschocke, High biofuel Blends in Aviation (HBBA) 2012, Lufthansa, 2-121 (Year: 2012).*
Tim Edwards, "Kerosene" Fuels for Aerospace Propulsion, 2002, American Institute of Aeronautics and Astronautics, 1-11 (Year: 2002).*

(Continued)

Primary Examiner — Ellen M McAvoy
Assistant Examiner — Ming Cheung Po
(74) Attorney, Agent, or Firm — Buchanan Ingersoll & Rooney PC

(57) ABSTRACT

The present invention relates to an aviation fuel composition comprising an aviation range fuel component and a diesel range fuel component originating from renewable sources, the diesel range fuel component having a cloud point of at most about −20° C. and existent gum more than about 7 mg/100 ml, wherein existent gum of the aviation fuel composition is at most about 7 mg/100 ml.

20 Claims, No Drawings

(56) References Cited

OTHER PUBLICATIONS

Thomas G.Smagala, Earl Christensen, Krege M. Christison, Rachel E. Mohler, Erica Gjersing, and Robert L. McCormick, Hydrocarbon Renewable and Synthetic Diesel Fuel Blendstocks: Composition and Properties, Energy Fuels 2013, 27, 237-246 (Year: 2013).*
International Search Report (PCT/ISA/210) dated Feb. 16, 2017, by the European Patent Office as the International Searching Authority for International Application No. PCT/EP2016/080976.
Written Opinion (PCT/ISA/237) dated Feb. 16, 2017, by the European Patent Office as the International Searching Authority for International Application No. PCT/EP2016/080976.
European Search Report dated May 30, 2016.
F. Pradelle et al., "Gum Formation in Gasoline and Its Blends: A Review", Energy & Fuels, American Chemical Society, Nov. 3, 2015, pp. 7753-7770.
C. Moses, "Comparative Evaluation of Semi-Synthetic Jet Fuels", Final Report, CRC Project No. AV-2-04a, Sep. 2008. (49 pages).
R. Jansson, "An Assessment of Biofuels and Synthetic Fuels as Substitutions of Conventional Diesel and Jet Fuels", Linköpings Universitet Institute of Technology, Feb. 13, 2008. (58 pages).
T. Edwards et al., "Evaluation of Combustion Performance of Alternative Aviation Fuels", American Institute of Aeronautics and Astronautics, AIAA 2010-7155, Jul. 25-28, 2010, pp. 1-21.
T. Edwards, "Reference Jet Fuels for Combustion Testing", American Institute of Aeronautics and Astronautics, Jan. 5, 2017, pp. 1-58.
Analysis of Conventional Jets Carried Out by the Opponent. (6 pages).
D. dos Santos et al., "Effect of the Addition of Solvents on Gum Formation in Automotive Gasolines", 2nd Brazilian Congress for Oil & Gas R&D, Jun. 15-18, 2003, with English Translation. (9 pages).
C. Moses, "Development of the Protocol for Acceptance of Synthetic Fuels Under Commercial Specification", Final Report, CRC Contract No. AV-2-04, Sep. 2007. (40 pages).
"Determination of the Existent Gum Content of Aviation Turbine Fuel—Jet Evaporation Method", Avtur Gum Content, IP. 540, 2014. (8 pages).
Defence Standard 91-91, Ministry of Defence, Turbine Fuel, Kerosine Type, Jet A-1, NATO Code: F-35, Issue 7, Feb. 18, 2011. (38 pages).
Standard Specification for Aviation Turbine Fuels, ASTM Standard D1655-10, 2010. (16 pages).
Standard Specification for Aviation Turbine Fuel Containing Synthesized Hydrocarbons, ASTM Standard D7566-11, 2011. (22 pages).
A. Zschocke et al., "High Biofuel Blends in Aviation (HBBA)", ENER/C2/2012/420-1, Interim Report, Mar. 27, 2015. (156 pages).
T. Smagala et al., "Hydrocarbon Renewable and Synthetic Diesel Fuel Blendstocks: Composition and Properties", Energy & Fuels, ACS Publications, 2012, pp. 237-246.
S. Boichenko et al., "Overview of Innovative Technologies for Aviation Fuels Production", Chemistry & Chemical Technology, Mar. 2013, pp. 305-312, vol. 7, No. 3.
Notice of Opposition dated Mar. 1, 2021, by the European Patent Office in corresponding European Patent No. 3184611, with English Translation (66 pages).
Notice of Opposition dated Mar. 3, 2021, by the European Patent Office in corresponding European Patent No. 3184611 (21 pages).

* cited by examiner

AVIATION FUEL COMPOSITION

FIELD OF THE INVENTION

The present invention relates to a high quality aviation fuel composition containing a sustainable diesel range fuel.

BACKGROUND OF THE INVENTION

There is a global interest to replace fossil fuels with fuels produced from renewable resources and to decrease emission of greenhouse gases. For example, diesel range fuels using vegetable oils and waste animal fat are already commonly used in fuels for transportation, particularly in ground transportation. There is an ever increasing demand to also reduce the emissions of the air traffic and to find more sustainable fuels for air transportation. There are different types of aviation fuels which are strictly specified in various standards. The strict requirements in part restrict the modification of the aviation fuels by means of other fuel compositions.

BRIEF DESCRIPTION OF THE INVENTION

It was surprisingly found in the present invention that it can be provided a high quality sustainable aviation fuel composition which meets the required specifications for different specific aviation fuels, including JET A-1 fuel, by replacing a conventional petroleum-based aviation fuel partly with a diesel range fuel produced from renewable sources. More particularly, existent gum of the aviation fuel composition of the invention surprisingly remains at a low level required for the current aviation fuels, although the existent gum in the diesel range fuel component included in the aviation fuel composition is significantly higher than that required. Without wishing to be bound by theory, it is believed that reduced existent gum levels in the composition of the invention are achieved in part due to the solubilizing ability of aromatic compounds present in conventional petroleum-based aviation fuels.

An object of the present invention is to provide an aviation fuel composition comprising
 a) an aviation range fuel component and
 b) a diesel range fuel component originating from renewable sources having a cloud point of at most about −20° C., specifically at most about −25° C., more specifically at most about −30° C., and existent gum more than about 7 mg/100 ml, wherein existent gum of the aviation fuel composition is at most about 7 mg/100 ml.

Another aspect of the present invention is to provide a method for producing an aviation fuel composition of the invention, comprising mixing component a) and component b).

The aviation fuel is generally also described as jet fuel or aviation kerosine. The term "aviation fuel" is meant to encompass all kinds of jet fuels meeting the requirements specified in various standards.

DETAILED DESCRIPTION OF THE INVENTION

There are several standards where minimum requirements for each type of specific aviation fuel are specified. Certain characteristics of the aviation fuels are distillation, a freezing point and a flash point, among others. For example, there are JET-A and JET-A 1 fuel requirements which are specified in standards DEF Stan 91-91, ASTM D1655 or ASTM D7566. Freezing point and existent gum are important properties of JET A and JET A-1 type aviation fuels. The primary physical difference between these fuels is a freezing point. Specification limits according to D7566 of these parameters for aviation turbine fuels containing synthesized hydrocarbons are shown in Table 1.

TABLE 1

| | | Limit | |
| --- | --- | --- | --- |
| Property | Method | JET A | JET A-1 |
| Freezing point | IP529 | max −40° C. | max −47° C. |
| Existent gum, mg/100 ml | IP540 | max 7 | max 7 |

In an aspect, the present invention provides an aviation fuel composition comprising
 a) an aviation range fuel component and
 b) a diesel range fuel component originating from renewable sources having a cloud point of at most about −20° C. and existent gum more than about 7 mg/100 ml, wherein existent gum of the aviation fuel composition is at most about 7 mg/100 ml.

In the present invention, the existent gum is measured in accordance with IP540 standard. The cloud point is measured in accordance with EN23015 or ASTM D7689.

In the composition of the invention, any kind of component can be used as component a) as long as the component meets the requirements specified in various aviation fuel standards. In an embodiment, component a) is selected from petroleum-based aviation range fuel, aviation range fuel derived from renewable sources and a mixture thereof. In another embodiment, component a) complies with at least one of aviation fuel standards selected from ASTM D1655, ASTM D7566 and DEFSTAN 91-91. In an embodiment, component a) is conventional JET A or JET A-1 fuel. The conventional JET A-1 fuel typically contains aromatic compounds in the range of 8.4 vol-% to 26.5 vol-%, paraffins in the range of 40 vol-% to 60 vol-%, and naphthenes 18 vol-% to 40 vol-%. The distillation range of JET A-1 fuel is typically from about 139° C. to about 300° C. (ASTM D86 or EN ISO 3405). Flash point of JET A-1 fuel is at least 38° C. (IP170).

Component b) of the aviation fuel composition of the invention is a diesel range fuel originating from renewable sources, having a cloud point of at most about −20° C. and existent gum more than 7 mg/100 ml. In an embodiment, the cloud point is at most about −25° C. In another embodiment, the cloud point is at most about −30° C.

Here, the term renewable source is meant to include feedstocks other than those obtained from petroleum crude oil. The renewable source that can be used in the present invention include, but is not limited to, bio oils and fats from plants and/or animals and/or fish and/or insects, and from processes utilizing microbes, such as algae, bacteria, yeasts and moulds, and suitable are also compounds derived from said fats and oils and mixtures thereof. The species yielding the bio oils or fats may be natural or genetically engineered. The bio oils and fats may be virgin oils and fats or recycled oils and fats.

Suitable bio oils containing fatty acids and/or fatty acid esters and/or fatty acid derivatives are wood-based and other plant-based and vegetable-based fats and oils such as rapeseed oil, colza oil, canola oil, tall oil, jatropha seed oil, sunflower oil, soybean oil, hempseed oil, olive oil, linseed oil, mustard oil, palm oil, peanut oil, castor oil, coconut oil, as well as fats contained in plants bred by means of gene manipulation, animal-based fats such as lard, tallow, train oil, and fats contained in milk, as well as recycled fats of the food industry and mixtures of the above, as well as fats and oils originating from processes utilizing microbes, such as algae, bacteria, yeasts and moulds.

Bio oil and fat suitable as fresh feed may comprise C12-C24 fatty acids, derivatives thereof such as anhydrides or esters of fatty acids as well as triglycerides and diglycerides of fatty acids or combinations of thereof. Fatty acids or fatty acid derivatives, such as esters may be produced via hydrolysis of bio oils or by their fractionalization or transesterification reactions of triglycerides or microbiological processes utilizing microbes.

In an embodiment, component b) is paraffinic diesel. In an embodiment, component b) is produced through Fischer-Tropsch process starting from gasification of biomass. This synthesis route is generally also called BTL, or biomass to liquid. It is well established in the literature that biomass, such as lignocellulosic material, can be gasified using oxygen or air in high temperature to yield a gas mixture of hydrogen and carbon monoxide (syngas). After purification of the gas, it can be used as feedstock for a Fischer-Tropsch synthesis route. In the Fischer-Tropsch synthesis paraffins are produced from syngas. The Fischer-Tropsch paraffins range from gaseous component to waxy paraffins and middle distillate boiling range paraffins can be obtained by distillation from the product. This middle distillate fraction can be used for production of Fischer-Tropsch derived diesel component.

In another embodiment, component b) is produced from renewable oil, such as vegetable oil, tall oil or animal fat or various waste streams containing fatty acids or triglycerides. The fatty acids and/or triglycerides of the renewable oil can be hydrogenated to yield normal paraffins (n-paraffins). It is well established in the literature that various hydrotreatment technologies, such as hydro-deoxygenation using NiMo, CoMo or NiW catalysts, can be used in order to remove the oxygen from fatty acid and acquire n-paraffins. N-paraffins acquired from renewable oils typically boil in the middle distillate range, but in certain case a distillation may be required to achieve a diesel fuel component.

Paraffinic component whether produced from biomass through Fischer-Tropsch synthesis or by hydrogenation of renewable oil is an excellent diesel fuel component. However, the formed n-paraffins have poor cold flow properties and typically need to be isomerized to improve their cold flow properties. In an embodiment of the invention, the paraffinic diesel is an isomerized paraffinic diesel. Isomerization of n-paraffins is well established in the literature and can be achieved e.g. by using Pt-SAPO-11 catalyst. An example of producing diesel fuel from renewable oil by hydrogenation followed by isomerization can be found in publication U.S. Pat. No. 8,278,492.

Distillation range of component b) is typically from 180° C. to 320° C. Flash point of component b) is more than 55° C. (EN ISO 2719).

In an embodiment, the existent gum of component b) is at most about 15000 mg/ml.

Component b) typically comprises aromatic compounds in an amount of at most about 0.5 vol-%, iso-paraffins in an amount from about 80 vol-% to about 95 vol-%, the rest being n-paraffins.

The aviation fuel composition of the invention can further comprise quantities of additional petroleum-based diesel range fuels. These diesel components can be introduced to the aviation fuel composition of the invention as long as Jet A-1 or Jet A specifications are met.

In an embodiment, the aviation fuel composition of the invention comprises up to about 20 vol-% of component b). In another embodiment, the composition comprises up to about 15 vol-% of component b). In a further embodiment, the composition comprises up to about 10 vol-% of component b).

In an embodiment, the aviation fuel composition of the invention comprises at least about 80 vol-% of component a). In another embodiment, the composition comprises at least about 85 vol-% of component a). In a further embodiment, the composition comprises at least about 90 vol-% of component a).

In an embodiment, the aviation fuel composition of the invention has a freezing point complying with the specification according to ASTM D1655, DEFSTAN 91-91 or ASTMD 7566.

In an embodiment, the aviation fuel composition of the invention complies with at least one of aviation fuel standards selected from ASTM D1655, ASTM D7566, DEFSTAN 91-91, JET A and JET A-1.

In another aspect, the present invention provides a method for producing an aviation fuel composition of the invention, comprising mixing component a) and component b).

The following examples are given for further illustration of the invention without limiting the invention thereto.

EXAMPLES

Example 1

Two aviation fuel blends of the invention indicated as samples 3 and 4 below were prepared from diesel range fuel component and an aviation range fuel component, indicated as sample 1 and 2, respectively.
1. renewable diesel range fuel; component b)
2. petroleum-based JET A-1 from Neste Refiner; component a)
3. 10 vol-% of sample 1 and 90 vol-% of sample 2
4. 15 vol-% of sample 1 and 85 vol-% of sample 2

Sample 1 is hydrogenated and isomerized diesel range fuel.

Freezing point and existent gum were determined with the methods given in Table 1 for the above samples 1.-4. and are shown in Table 2.

TABLE 2

| Property/Sample | 1 | 2 | 3 | 4 |
| --- | --- | --- | --- | --- |
| Freezing point, ° C. | −29.9 | −67.0 | −56.3 | −52.7 |
| Existent gum, mg/100 ml | 10384 | 2 | 2 | 2 |

The results show that samples nos. 3 and 4 comply with strict D7566 requirements for JET A-1 fuel.

The results further show that a high quality aviation range fuel meeting required specifications can be obtained by blending conventional petroleum aviation fuel with up to 15 vol-% of diesel range fuel derived from renewable source having a very high existent gum content (10384 mg/100 ml). Linear calculation based on the proportions of the petroleum aviation fuel and diesel fuel would result in 1038.4 mg/100 ml for sample 3 and 1557.6 mg/100 ml for sample 4.

Example 2

The effect of aromatic compounds on existent gum formation of two different diesel range fuels derived from renewable source was investigated. Component b1 is sample 1 described in Example 1, having a cloud point of −33° C. Component b2 has a cloud point of −15° C. n-propyl benzene which is present in conventional petroleum aviation fuel was used as an aromatic reference compound in the experiment. The existent gum of the diesel components and of the blends of the components with varying n-propyl benzene contents are shown in Table 3.

TABLE 3

|  | Existent gum, mg/100 ml |
| --- | --- |
| Component b1) of Example 1 | 10384 |
| Component b1) + 4 vol-% n-propyl benzene | 2773 |
| Component b1) + 24 vol-% n-propyl benzene | 305 |
| Component b2) | 14889 |
| Component b2) + 4 vol-% n-propyl benzene | 5089 |
| Component b2) + 24 vol-% n-propyl benzene | 3588 |

The results of Table 3 show that the existent gum is reduced in part due to solubilizing effect of n-propyl benzene.

It will be obvious to a person skilled in the art that, as the technology advances, the inventive concept can be implemented in various ways. The invention and its embodiments are not limited to the examples described above but may vary within the scope of the claims.

The invention claimed is:

1. An aviation fuel composition comprising:
   a) an aviation range fuel component, wherein component a) is a conventional JET A-1 containing aromatic compounds in the range of 8.4 vol-% to 26.5 vol-%, paraffins in the range of 40 vol-% to 60 vol-%, and naphthenes in the range of 18 vol-% to 40 vol-%; and
   b) a diesel range fuel component of paraffinic diesel originating from Fischer-Tropsch synthesis products of renewable origin or hydrogenated fatty acid and/or triglyceride materials of renewable origin, wherein the diesel range fuel component has a cloud point of at most −30° C., and an existent gum content in accordance with the IP540 standard of more than 7 mg/100 ml;
   the aviation fuel composition comprising 10-20 vol-% of component b) and at least 80 vol-% of component a), wherein, due to solubilizing activity of aromatic compounds in component a), the aviation fuel composition has an existent gum content in accordance with an IP540 standard of at most 7 mg/100 ml, and
   wherein the aviation fuel composition complies with at least one of aviation fuel standards selected from ASTM D1655, ASTM D7566, DEFSTAN 91-91, JET A and JET A-1,
   wherein component b) comprises:
      aromatic compounds in an amount of at most about 0.5 vol-%, iso-paraffins in an amount from about 80 vol-% to about 95 vol-%, the rest being n-paraffins.

2. The aviation fuel composition of claim 1, wherein component a) is selected from petroleum-based aviation range fuel, aviation range fuel of renewable origin, and a mixture thereof.

3. The aviation fuel composition of claim 1, wherein component a) complies with at least one of aviation fuel standards selected from ASTM D1655, ASTM D7566 and DEFSTAN 91-91.

4. The aviation fuel composition of claim 1, wherein the paraffinic diesel is an isomerized paraffinic diesel.

5. The aviation fuel composition of claim 1, wherein existent gum of component b) is at most about 15000 mg/ml.

6. The aviation fuel composition of claim 1, wherein the composition further comprises:
   a petroleum-based diesel range fuel component, wherein the composition further comprising the petroleum-based diesel range fuel component complies with at least one of aviation fuel standards selected from JET A and JET A-1.

7. The aviation fuel composition of claim 1, wherein the composition comprises 10-15 vol-% of component b).

8. The aviation fuel composition of claim 1, wherein the composition comprises at least 85 vol-% of component a).

9. The aviation fuel composition of claim 1, wherein the freezing point of the aviation fuel composition complies with the specification according to ASTM D1655, DEFSTAN 91-91 or ASTMD 7566.

10. The aviation fuel composition of claim 1, wherein linear calculation based on proportions of components a) and b) would not result in an existent gum content of at most 7 mg/100 ml in accordance with said IP540 standard.

11. A method for producing an aviation fuel composition, the method comprising:
   providing:
      a) an aviation range fuel component, wherein component a) is a conventional JET A-1 containing aromatic compounds in the range of 8.4 vol-% to 26.5 vol-%, paraffins in the range of 40 vol-% to 60 vol-%, and naphthenes in the range of 18 vol-% to 40 vol-%, and
      producing b) a diesel range fuel component of paraffinic diesel of renewable origin from Fischer-Tropsch synthesis products or hydrogenated fatty acid and/or triglyceride materials of renewable origin, wherein the diesel range fuel component has a cloud point of at most −30° C., and an existent gum content in accordance with the IP540 standard of more than 7 mg/100 ml; and obtaining the aviation fuel composition by mixing component a) and component b) in an amount comprising 10-20 vol-% of component b) and at least 80 vol-% of component a),
   wherein, due to solubilizing activity of aromatic compounds in component a), the obtained aviation fuel composition has an existent gum content in accordance with an IP540 standard of at most 7 mg/100 ml, and
   wherein the obtained aviation fuel composition complies with at least one of aviation fuel standards selected from ASTM D1655, ASTM D7566, DEFSTAN 91-91, JET A and JET A-1,
   wherein component b) comprises aromatic compounds in an amount of at most 0.5 vol-%, iso-paraffins in an amount from 80 vol-% to 95 vol-%, the rest being n-paraffins.

12. The method of claim 11, wherein component a) is selected from petroleum-based aviation range fuel, aviation range fuel of renewable origin, and a mixture thereof.

13. The method of claim 11, wherein component a) complies with at least one of aviation fuel standards selected from ASTM D1655, ASTM D7566 and DEFSTAN 91-91.

14. The method of claim 11, wherein the paraffinic diesel is an isomerized paraffinic diesel.

15. The method of claim 11, wherein the existent gum content in accordance with the IP540 standard of component b) is at most 15000 mg/ml.

16. The method of claim 11, wherein the method further comprises introducing a petroleum-based diesel range fuel component to the composition, wherein the composition further comprising the petroleum-based diesel range fuel component complies with at least one of aviation fuel standards selected from JET A and JET A-1.

17. The method of claim 11, wherein the composition comprises 10-15 vol-% of component b).

18. The method of claim 11, wherein the composition comprises at least 85 vol-% of component a).

19. The method of claim 11, wherein the freezing point of the aviation fuel composition complies with the specification according to ASTM D1655, DEFSTAN 91-91 or ASTMD 7566.

20. The method of claim 11, wherein linear calculation based on proportions of components a) and b) would not result in an existent gum content of at most 7 mg/100 ml in accordance with said IP540 standard.

* * * * *